(12) United States Patent
Dewan et al.

(10) Patent No.: US 8,331,699 B2
(45) Date of Patent: Dec. 11, 2012

(54) HIERARCHICAL CLASSIFIER FOR DATA CLASSIFICATION

(75) Inventors: Maneesh Dewan, West Chester, PA (US); Gerardo Hermosillo Valadez, West Chester, PA (US); Zhao Yi, Los Angeles, CA (US); Yiqiang Zhan, Berwyn, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 314 days.

(21) Appl. No.: 12/887,640

(22) Filed: Sep. 22, 2010

(65) Prior Publication Data

US 2011/0044534 A1    Feb. 24, 2011

Related U.S. Application Data

(63) Continuation-in-part of application No. 12/723,909, filed on Mar. 15, 2010.

(60) Provisional application No. 61/244,554, filed on Sep. 22, 2009, provisional application No. 61/160,560, filed on Mar. 16, 2009, provisional application No. 61/244,502, filed on Sep. 22, 2009.

(51) Int. Cl.
*G06K 9/68* (2006.01)
*G06K 9/62* (2006.01)

(52) U.S. Cl. ........................................ 382/226; 382/159

(58) Field of Classification Search .................. 382/159, 382/226, 227, 228
See application file for complete search history.

(56) References Cited

U.S. PATENT DOCUMENTS

| 7,003,490 B1* | 2/2006 | Keyes ............................. 705/38 |
| 7,266,548 B2* | 9/2007 | Weare ................................ 1/1 |
| 2008/0071711 A1* | 3/2008 | Zhang et al. .................... 706/20 |

OTHER PUBLICATIONS

Lior Rokach and Oded Maimon, "Top-Down Induction of Decision Trees Classifiers—A Survey", IEEE Transactions on Systems, Man and Cybernetics: Part C, vol. 1, No. 11, Nov. 2002.

* cited by examiner

*Primary Examiner* — Daniel Mariam
(74) *Attorney, Agent, or Firm* — Peter Withstandley

(57) ABSTRACT

Described herein is a framework for constructing a hierarchical classifier for facilitating classification of digitized data. In one implementation, a divergence measure of a node of the hierarchical classifier is determined. Data at the node is divided into at least two child nodes based on a splitting criterion to form at least a portion of the hierarchical classifier. The splitting criterion is selected based on the divergence measure. If the divergence measure is less than a predetermined threshold value, the splitting criterion comprises a divergence-based splitting criterion which maximizes subsequent divergence after a split. Otherwise, the splitting criterion comprises an information-based splitting criterion which seeks to minimize subsequent misclassification error after the split.

20 Claims, 6 Drawing Sheets

HIERARCHICAL CLASSIFIER FOR DATA CLASSIFICATION

CROSS-REFERENCE TO RELATED APPLICATIONS

This application claims the benefit of U.S. provisional application Ser. No. 61/244,554 filed Sep. 22, 2009, which is incorporated herein by reference in its entirety.

This application is also a continuation-in-part of co-pending U.S. patent application Ser. No. 12/723,909 filed Mar. 15, 2010, which claims the benefit of U.S. provisional application Ser. No. 61/160,560 filed Mar. 16, 2009 and U.S. provisional application Ser. No. 61/244,502 filed Sep. 22, 2009, the entire contents of which are incorporated herein by reference.

TECHNICAL FIELD

The present disclosure relates generally to automated or partially automated organization of digital or digitized data and, more specifically, to classification of such data.

BACKGROUND

Classification techniques are widely used to manage and organize large volumes of scattered data into meaningful categories. In particular, classification is the task of analyzing numerical properties of various features depicted in the data, and organizing them into categories. This categorization of data into classes can be helpful in many applications, including computer-aided medical diagnosis, treatment effectiveness analysis, performance prediction, marketing and even financial analysis.

Classification is a form of learning that is based on the assumption that the data in question depicts one or more features, and that each of these features belongs to one or several distinct and exclusive classes. In particular, classification typically involves generating a model (or classifier) based on a training set of data samples accompanied by class labels. During the training phase, characteristic properties of typical features are isolated and, based on these features a classifier that uniquely describes the classification category is generated.

Many methods may be used to train the classifier, such as regression trees and Adaboost. Such methods, however, typically aim to decrease training error in a greedy manner. Since such greedy algorithms always make the immediate locally optimal decision at each node or phase, they tend to converge to local maxima or plateaus. The greedy learning process cannot guarantee a globally optimal solution, especially in multi-modal datasets that include many local maxima.

As such, it is desirable to provide a more effective method that minimizes classification error and achieves a more globally optimal solution.

SUMMARY

A technology for constructing a hierarchical classifier for facilitating classification of digitized data is described herein. In one implementation, a divergence measure of a node of the hierarchical classifier is determined. Data at the node is divided into at least two child nodes based on a splitting criterion to form at least a portion of the hierarchical classifier. The splitting criterion is selected based on the divergence measure. If the divergence measure is less than a predetermined threshold value, the splitting criterion comprises a divergence-based splitting criterion which maximizes subsequent divergence after a split. Otherwise, the splitting criterion comprises an information-based splitting criterion which seeks to minimize subsequent misclassification error after the split.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. The same numbers are used throughout the drawings to reference like elements and features.

DETAILED DESCRIPTION

Figure 1:
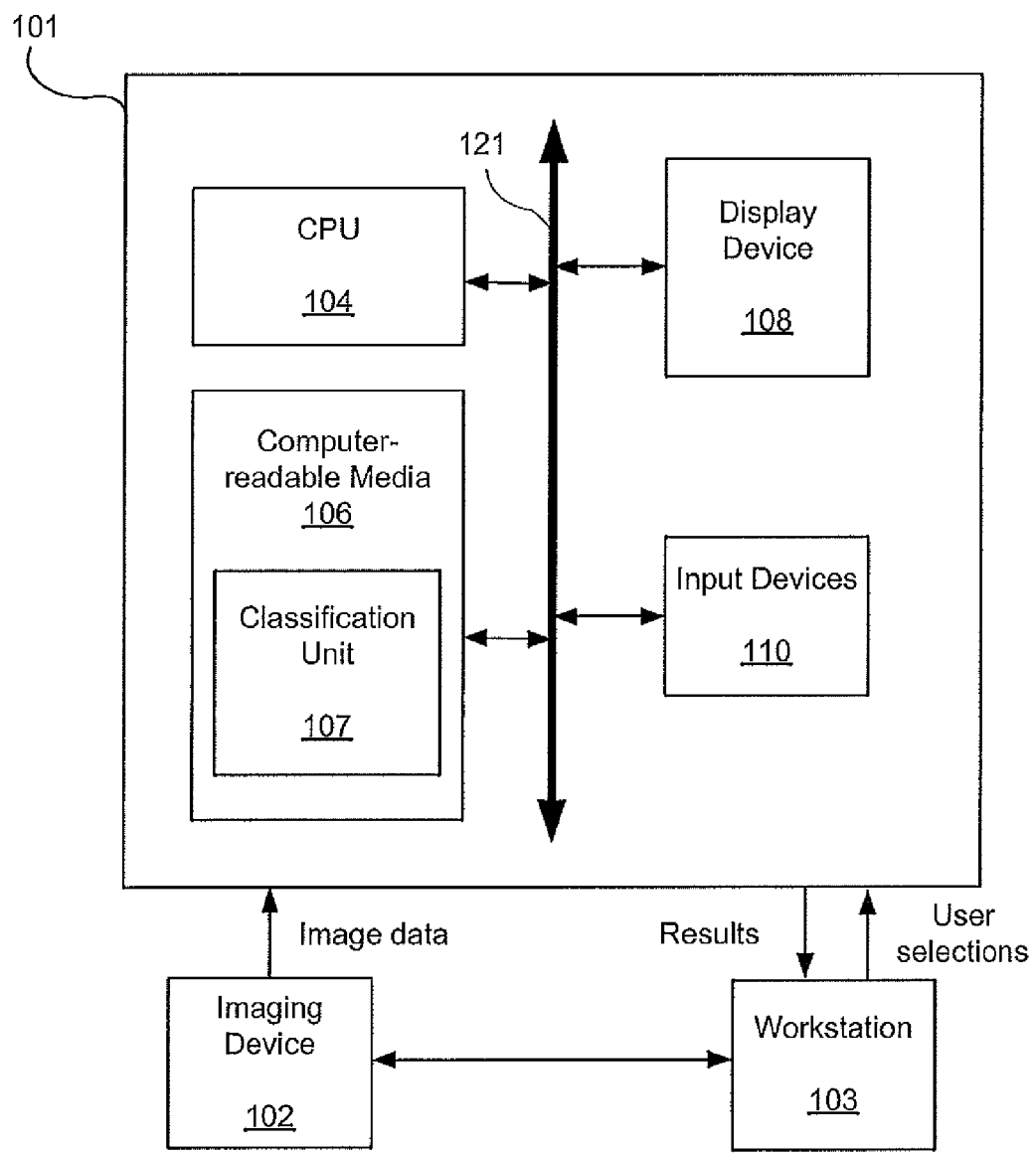
FIG. 1 shows an exemplary system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to x-ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulate and transform data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2D images and voxels for 3D images). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to $R$ or $R^7$, the methods of the inventions are not limited to such images, and can be applied to images of any dimension, e.g., a 2D picture or a 3D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

It is noted that, while a particular application directed to segmentation of medical image data in a computer-aided detection (CAD) application may be shown, the technology is not limited to the specific embodiment illustrated. The present technology has application to, for example, other types of CAD applications, and classifying non-medical image data or non-image data (e.g., financial data). In addition, the present framework may be applied in various fields, such as decision theory, statistics, data mining, machine learning and pattern recognition.

In one implementation, a framework for facilitating classification of digitized data is provided. More specifically, a divide-and-conquer approach is presented so as to reduce the classification complexity and subsequent training errors. In one implementation, clustering is incorporated into a decision tree classification framework for joint feature selection, clustering and classification. A decision may be made at each node of the decision tree as to whether to perform clustering or classification. The purpose of clustering is to maximize class separability, while classification serves to reduce classification error. The classification complexity is advantageously reduced as a result of incorporating clustering in the nodes of the decision tree.

FIG. 1 shows a block diagram illustrating an exemplary classification system 100. In one implementation, the classification system 100 is used for computer-aided medical diagnosis. It is understood that the system 100 may also used for other applications, including non-medical applications (e.g., financial or engineering applications). The classification system 100 includes a computer system 101 for implementing the framework as described herein. The computer system 101 may be further connected to an imaging device 102 and a workstation 103, over a wired or wireless network. The imaging device 102 may be a radiology scanner such as a MR scanner or a PET/CT scanner for acquiring medical image data.

Computer system 101 may be a desktop personal computer, a portable laptop computer, another portable device, a mini-computer, a mainframe computer, a server, a storage system, a dedicated digital appliance, or another device having a storage sub-system configured to store a collection of digital data items. In one implementation, computer system 101 comprises a processor or central processing unit (CPU) 104 coupled to one or more computer-readable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus.

It is to be understood that the present technology may be implemented in various forms of hardware, software, firmware, special purpose processors, or a combination thereof. Computer-readable media 106 may include random access memory (RAM), read only memory (ROM), magnetic floppy disk, flash memory, and other types of memories, or a combination thereof.

In one implementation, the techniques described herein are implemented as computer-readable program code, which is tangibly embodied in computer-readable media 106, such as in a classification unit 107. The computer-readable program code may be executed by CPU 104 to process image data (e.g., MR or CT images) from the imaging device 102 (e.g., MRI or CT scanner). As such, the computer system 101 is a general-purpose computer system that becomes a specific purpose computer system when executing the computer readable program code. The computer-readable program code is not intended to be limited to any particular programming language and implementation thereof. It will be appreciated that a variety of programming languages and coding thereof may be used to implement the teachings of the disclosure contained herein.

Computer system 101 may also include an operating system and microinstruction code. The various techniques described herein may be implemented either as part of the microinstruction code or as part of an application program or software product, or a combination thereof, which is executed via the operating system. Various other peripheral devices, such as additional data storage devices and printing devices, may be connected to the computer system 101. Other computer systems may also be coupled to the computer system 101 in, for example, a cloud computing environment or a networked environment.

The workstation 103 may include a computer and appropriate peripherals, such as a keyboard and display, and can be operated in conjunction with the entire CAD system 100. For example, the workstation 103 may communicate with the imaging device 102 so that the image data collected by the imaging device 102 can be rendered at the workstation 103 and viewed on the display. The workstation 103 may further include a user interface that allows a radiologist or any other skilled user (e.g., physician, technician, operator) to manipulate the image data. The workstation 103 may communicate directly with the computer system 101 to access and display previously processed data (e.g., classification or segmentation results) so that the user can manually verify the results of the present framework.

Figure 2:
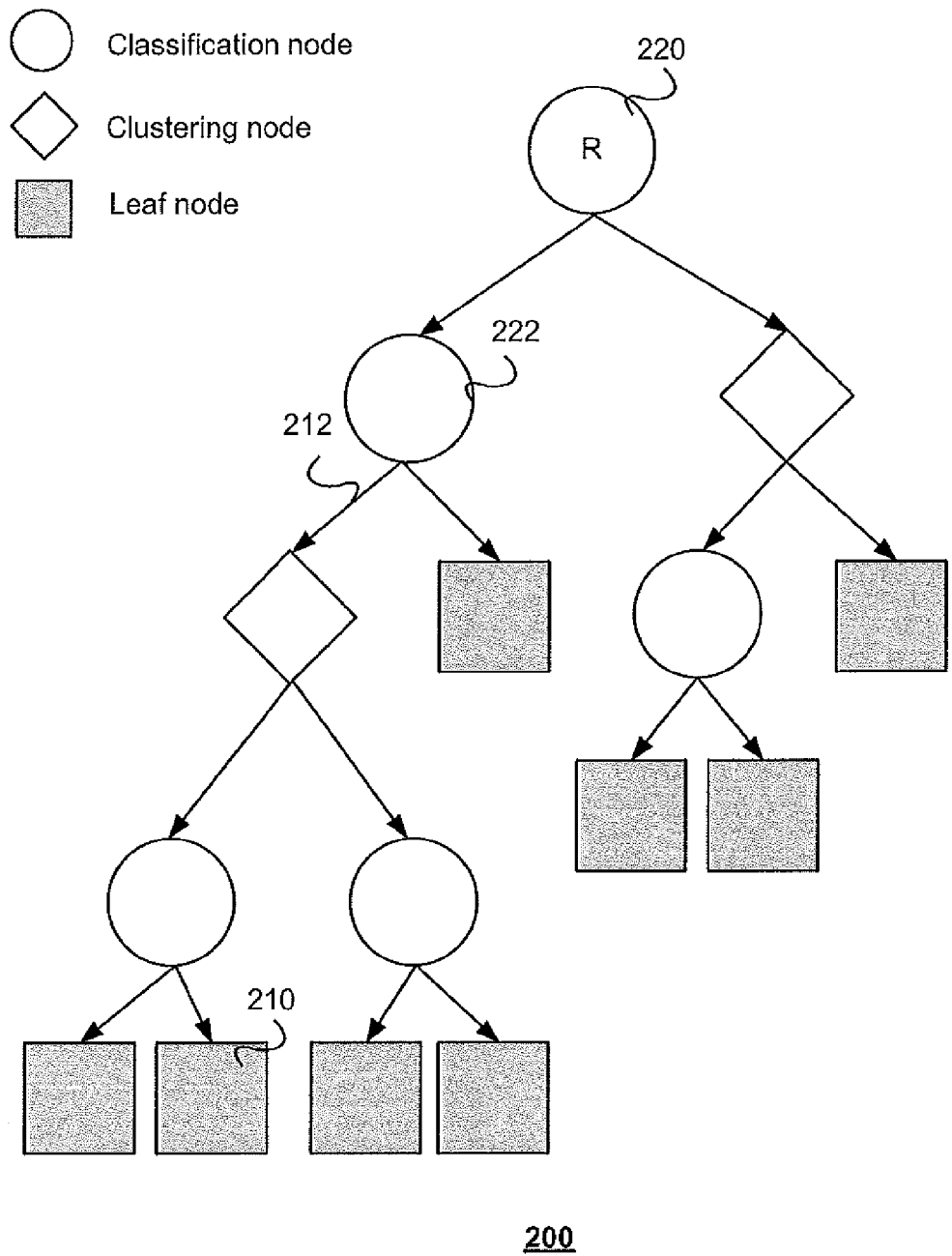
FIG. 2 shows an exemplary decision tree.

FIG. 2 shows an exemplary decision tree 200 generated in accordance with one implementation of the present framework. In general, a decision tree is a hierarchical classifier expressed in the form of a tree structure. The decision tree 200 comprises a root node 220 having no incoming edges, non-leaf nodes 222 with outgoing edges 212, and leaf nodes 210 (i.e. terminal or decision nodes) with no outgoing edges. The decision tree 200 is trained by a set of labeled samples, and can be used to predict the value of a target input variable. The path from the root 220 via the non-leaf node 222 and to the leaf node 210 defines a rule that describes the cluster at the leaf node 210.

In one implementation, the leaf nodes 210 provide a conclusion about whether an input sample belongs to a certain class. Alternatively, the leaf nodes 210 represent probabilities of the target input variable having a certain value. In the context of image segmentation, for example, the decision tree 200 may be used to categorize an image voxel (or pixel) into a boundary class or a non-boundary class. The leaf nodes 210 represent voxel classifications and the branches 212 represent input image samples that lead to those classifications. The voxels corresponding to a boundary class delineate a region of interest (ROI) in the image. A ROI refers to a volume or area (e.g., central slice of the volume) identified for further study and processing. For example, an ROI may be associated with a human organ (e.g., liver, colon, heart, etc.) or a portion thereof. The ROI may be automatically detected using a computer-aided detection technique, such as one that detects points where the increase in voxel intensity is above a certain threshold. Alternatively, ROIs may be identified manually by, for example, a skilled user via a user-interface at workstation 103.

Although a binary decision tree 200 is depicted in FIG. 2 for illustration purposes, it is understood that other types of hierarchical classifiers, such as quad-trees or other non-binary trees, may also be constructed by the present framework. The present framework may also be adapted to construct a collection of decision trees. For example, the present framework may be used to construct a forest-based classifier such as one or more random forests. Random forests comprise multiple learned random decision trees. During training of each individual random decision tree, each node has available only a randomly chosen subset of features from an entire pool. Depending on the amount of data available for training, each decision tree may also be trained by a random subset of data. Training is achieved by finding the node function and threshold which yield maximum information gain.

In one implementation, the decision tree 200 is constructed by analyzing the data in the current node (starting with the root node R) and dividing the data into at least two child nodes in accordance with a splitting criterion. Each of these child nodes may then be further split into at least two child nodes, thereby creating at least a portion of the decision tree data structure 200. The splitting criterion is determined by the type of node being split.

In accordance with one implementation, there are two types of nodes: a classification node and a clustering node. The type of node may be determined based on the divergence measure of the data in the node. Divergence refers to the level of separation or probabilistic distance between classes. Exemplary measures of divergence include, but are not limited to, Kullback-Leibler (KL) divergence (or relative entropy), weighted KL divergence, Jensen-Shannon (JS) divergence, Euclidean distance, Hellinger distance, etc. Other measures suitable for evaluating the separability of two or more classes may also be used. The divergence measure may be used for automatic feature selection, cluster number determination and node decision making, as will be discussed in more detail later.

In accordance with one implementation, the divergence measure is used to determine the type of node in the decision tree 200. If the divergence measure is low, the node is determined to be a clustering node 222; otherwise, the node is determined to be a classification node 220. The type of node characterizes the type of splitting criteria that is applied at the node. For example, at a clustering node 222, the splitting decision is based on a measure of divergence (e.g., KL divergence) so as to maximize subsequent divergence and reduce future classification complexity. At a classification node 220, the splitting decision is based on an information-based measure (e.g., entropy) so as to minimize subsequent misclassification error as much as possible. By providing both classification and clustering nodes, the present framework is more globally optimized than conventional techniques because it takes into account both class separability and misclassification error during the training process.

Figure 3:
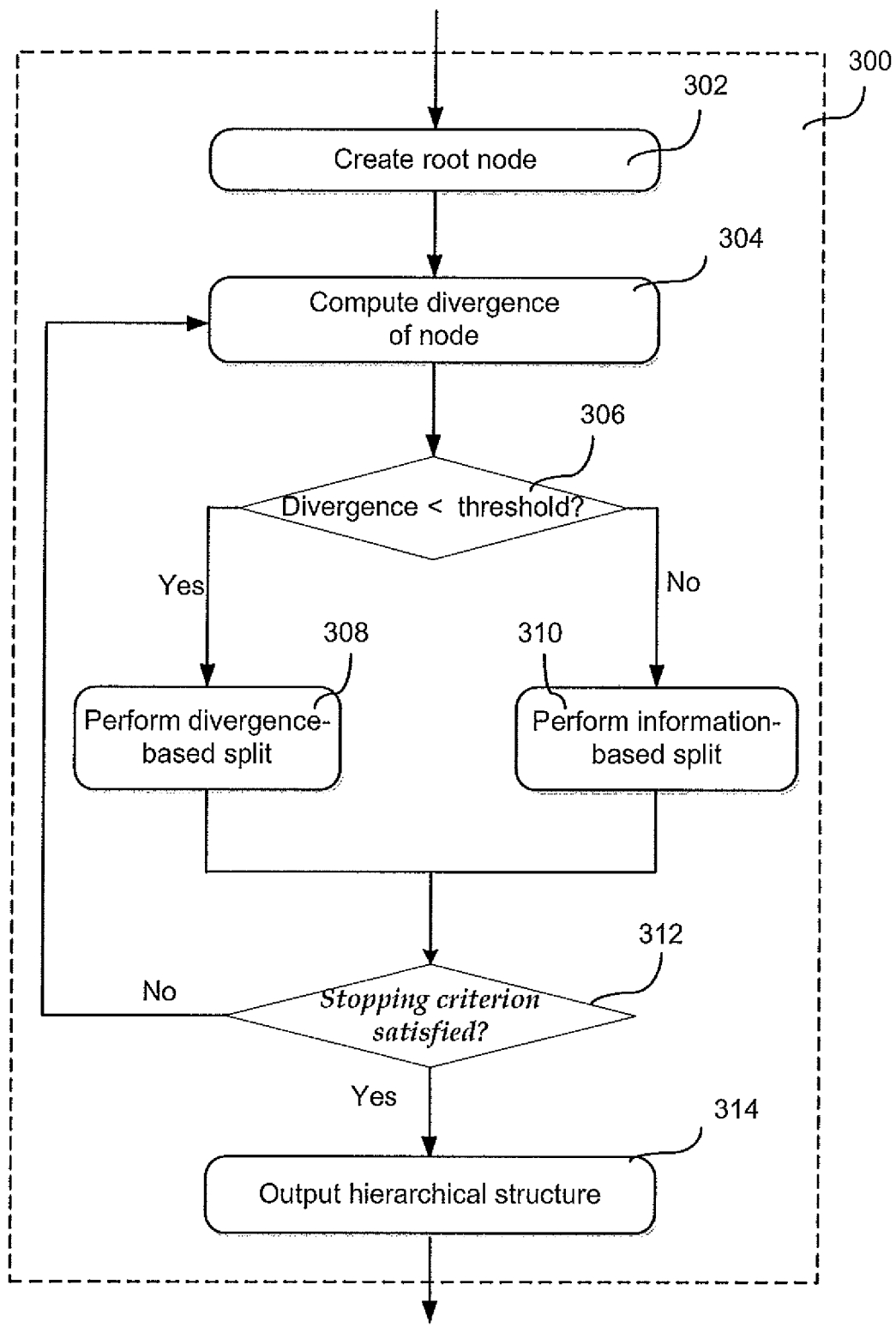
FIG. 3 shows an exemplary classification method.

FIG. 3 shows an exemplary classification method 300. The method 300 may be implemented by, for example, classification unit 107. In one implementation, the classification unit 107 receives training data to automatically construct a hierarchical classifier, such as the decision tree 200 previously described with reference to FIG. 2. The decision tree 200 may be built recursively by performing steps 304-312, as shown in FIG. 3. Each node may be further subdivided into small subsets until the desired levels of hierarchy are achieved or other stopping criterion is satisfied.

At 302, root node R is created. In one implementation, the root node R of the decision tree 200 corresponds to the entire training feature space. In the context of image classification, for example, the root node R represents the entire set of training images. In a two-class application, such as an image segmentation application, each training image may include positive and negative image samples. The positive image samples correspond to boundary pixels (or voxels), while the negative image samples correspond to non-boundary pixels (or voxels). It is understood that the present framework may also be applied to applications with more than two classes.

At 304, the divergence of the current node is computed, starting from the root node R. Subsequent child nodes are then processed at step 304. Each child node represents a sub-space of the feature space. In one implementation, the divergence is computed by determining the separability between two or more classes in the node. As discussed previously, an exemplary divergence measure is the Kullback-Leibler (KL) divergence. Other types of divergence measures, such as weighted KL divergence, Jensen-Shannon (JS) divergence, Euclidean distance, or Hollinger distance, may also be used.

More particularly, KL divergence (or relative entropy) is a measure of the difference between two probability distributions. KL divergence is minimal when positive and negative samples have the same feature statistics, and maximal when positive and negative samples have non-overlapping feature statistics. In one implementation, KL divergence may be expressed as follows:

$$KL(S) = \max_f \sum_a P(f(x_i) = a \mid x_i \in S_{pos}) \log \frac{P(f(x_i) = a \mid x_i \in S_{pos})}{P(f(x_i) = a \mid x_i \in S_{neg})} \quad (1)$$

wherein S represents the training set of labeled samples in the current node, and $S_{pos}$ and $S_{neg}$ represent the positive and negative samples respectively. $P(f(x_i)=a|x_i \in S_{pos})$ denotes the probability that a feature value of a sample $x_i$ is equal to a given $x_i$ is a positive sample, and $P(f(x_i)=a|x_i \in S_{neg})$ represents the probability that a feature value of a sample $x_i$ is equal to a given $x_i$ is a negative sample. It is understood that there may be other ways of expressing the KL divergence.

At 306, the divergence (or class separability) is compared with a threshold value. The threshold value typically affects the hierarchical structure and thus the overall performance of the classification framework. In one implementation, the threshold value is determined heuristically to achieve optimal classification performance. Automated or semi-automated determination of the threshold value may also be useful. The threshold value may be, for example, about 0.5 for a liver segmentation application. Other threshold values are also useful, depending on the input data and the application.

If the divergence is less than about the threshold value (i.e. low), a divergence-based split is performed at 308. Otherwise, an information-based split is performed at 310. A divergence-based split may be performed at 308 by splitting a current node into at least two child nodes in a way that achieves the maximal class separability increase after the split. In one implementation, the divergence-based split is performed by splitting a set of training samples (S) into two subsets (left and right) of training samples ($S_l$ and $S_r$) based on a divergence measure. The splitting criterion seeks to maximize subsequent overall divergence (or class separability). Feature selection may performed by optimizing a KL divergence splitting criterion, as shown by Equation (2):

$$\text{Split}(S, f, \theta) = \exp(-KL(S)) - \frac{n_l}{n}\exp(-KL(S_l)) - \frac{n_r}{n}\exp(-KL(S_r)) \quad (2)$$

wherein S represents a training set, f represents a set of features, $\theta$ denotes the set of parameters corresponding to the set of features, and n, $n_l$, and $n_r$ denote the number of samples at the current node, left child node and right child node respectively.

The divergence-based splitting criterion may also be based on the Jensen-Shannon (JS) divergence. The JS divergence is a symmetric version of the KL divergence that is numerically stable and bounded in [0,1]. In one implementation, the JS divergence is expressed as follows:

$$JS(p, q) = \frac{1}{2}\left(KL\left(p, \frac{p+q}{2}\right) + KL\left(q, \frac{p-q}{2}\right)\right) \quad (3)$$

wherein p and q represent the probability distributions for which the JS is computed. For example, p and q may represent the respective probabilities of the positive and negative classes corresponding to a particular feature. An alternative formulation of the JS divergence is as follows:

$$JS(p, q) = \frac{1}{2}\left(KL\left(p, \frac{p+q}{2}\right) + KL\left(q, \frac{p+q}{2}\right)\right) \quad (4)$$

In another implementation, the divergence-based splitting criterion is based on the weighted Kullback-Leibler (KL) divergence. The weighted KL divergence splitting criterion seeks to maximize the weighted sum of the KL divergences of the samples in the node. The KL divergence is weighted by pairwise weights $w(x_i, x_j)$, which measure the spatial distance between positive samples $S_{pos}$ and negative samples $S_{neg}$ in a node. The pairwise weight $w(x_i, x_j)$ is smaller when the positive and negative samples are further apart and larger when they are closer together. In one implementation, the pairwise weights are expressed as follows:

$$w(x_i, x_j) = \frac{1}{\|x_i - x_j\|}, \quad (5)$$
$$x_i \in S_{pos},$$
$$x_j \in S_{neg}$$

It is understood that other types of divergence or class separability measures, including but not limited to other variants of the KL divergence (e.g., skew divergence), may also be used in the divergence-based splitting criterion.

At 310, an information-based split is performed by subdividing a node into at least two child nodes in a way that minimizes subsequent misclassification error after the split. An information-based split involves a measure that originates from information theory, which involves the quantification of information based on probability theory and statistics. In one implementation, the information-based split is based on an entropy measure. Entropy is an exemplary measure of label impurity or misclassification of the node in question. The higher the entropy is, the higher the potential to improve the classification. Entropy is minimal when data samples are all from a single class and maximal when data samples are equally distributed from multiple classes.

In one implementation, entropy of a training set S is expressed as follows:

$$\text{entropy}(S) = -\sum_{i=1}^{C} P(y_i = c \mid x_i \in S)\log P(y_i = c \mid x_i \in S) \quad (6)$$

wherein $x_i$ is the training sample in set S associated with the current node, C is the number of different values of the class label $y_i$, and $P(y_i=c|x_i \in S)$ is the probability of $y_i$ having a value of c given $x_i$. The entropy splitting criterion seeks to minimize entropy (or impurity) after a split, and may be formulated as follows:

$$\text{Split}(S, f, \theta) = \text{entropy}(S) - \frac{n_l}{n}\text{entropy}(S_l) - \frac{n_r}{n}\text{entropy}(S_r) \quad (7)$$

wherein S represents a training set, f represents a set of features, $\theta$ denotes the parameters corresponding to the set of features, n, $n_l$, and $n_r$ denote the number of samples at the current node, left child node and right child node respectively.

The information-based splitting criterion may also be based on other types of information-based or impurity measures. For example, the Gini index (or Gini coefficient) is one possible information-based function that can be used. The Gini index measures the divergence between the probability distributions of the target attribute's values. Alternatively, a likelihood ratio, such as one that is based on chi-square statistics, may also be used as the basis of the information-based splitting criterion. The likelihood ratio is useful for measuring the statistical significance of the information gain criteria. Other types of information-based measures, such as a gain ratio, may also be used.

At 312, the classification unit 107 checks to see if the stopping criterion has been satisfied. The stopping criterion may be satisfied if, for example, the maximum tree depth has been reached. Alternatively, the stopping criterion may be satisfied if all instances in the training set belong to a single value of attribute value. Other types of stopping criteria may also be used. If the stopping criterion has not been satisfied at 312, the classification unit 107 returns to step 304. If the stopping criterion has been satisfied, the hierarchical classifier is output at step 314. The resulting hierarchical classifier may be used to predict the value of input test data. For example, in the context of image segmentation, the hierarchical classifier may be applied to each input pixel in the test image to classify it as a boundary or non-boundary class.

Figure 4A:
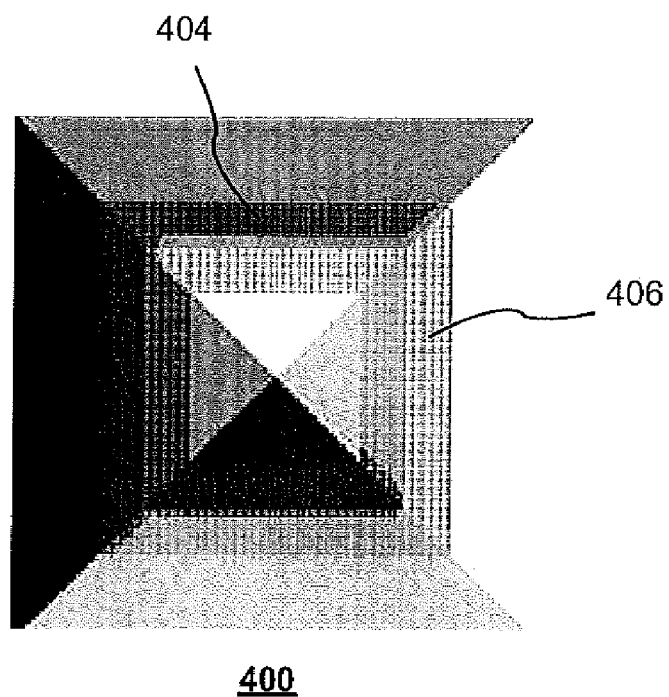
FIG. 4a shows an image after a divergence split.
Figure 4B:
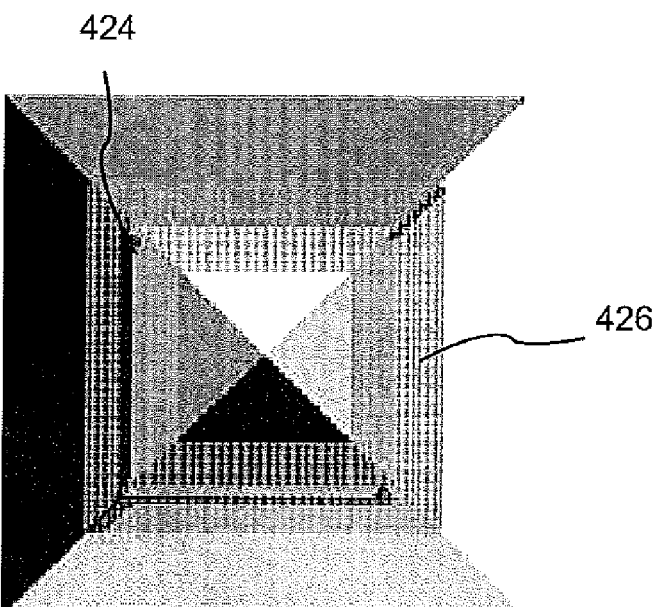
FIG. 4b shows an image after an entropy split.

To illustrate the differences between divergence-based splitting and information-based splitting, FIG. 4a shows an image 400 after a divergence-based split and FIG. 4b shows an image 420 after an entropy split. The various shaded regions (404, 406, 424 and 426) are each associated with a child node after a first node split. As shown in FIG. 4a, after the divergence-based split, the samples are evenly distributed in the child nodes (404 and 406), which results in a more balanced decision tree. Neighboring positive and negative samples may also be grouped in the same node. The entropy split, on the other hand, tries to reduce misclassification as much as possible, but is not aware of class separability. As shown in FIG. 4b, this may result in an unbalanced decision tree where the majority of the samples are grouped in a child node 426, while the other child node 424 contains only a small number of samples from the same class.

Figure 5:
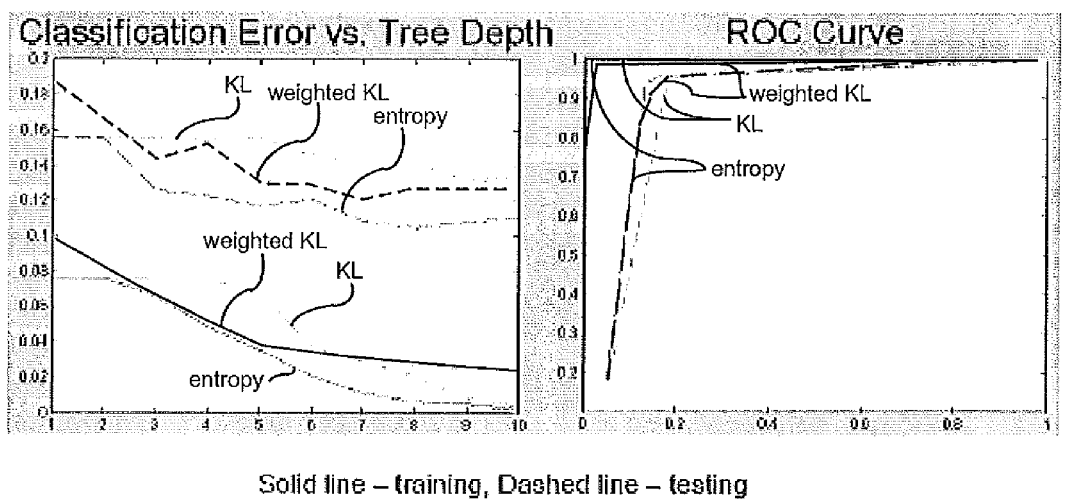
FIG. 5 illustrates a comparison between different types of splits.

The problem with the divergence-based split, however, is that it does not take into account misclassifications. Although the KL split may result in better class separability, the subsequent misclassification may increase. FIG. 5 compares the classification errors for the different types of splits. As shown, the classification error for the entropy split is generally lower than both KL splitting and the weighted KL splitting.

The present framework advantageously creates a more balanced hierarchical classifier that maximizes class separability and minimizes misclassifications, by providing both divergence-based and information-based splits.

The described hierarchical classifier may be particularly suited to facilitate segmentation of regions of interest in image data. In one implementation, the hierarchical model includes spatially adaptive boundary detectors for detecting boundaries delineating regions of interest. One major advantage of the present framework is that it allows for generic segmentation of images, and may be directly applied to a new surface (or structure) of another imaging modality, without requiring a change in parameters in the deformable model. At most, the changes that may be required are the annotation of new training samples.

One aspect of the present framework automatically constructs the deformable hierarchical model from training samples. The boundary appearance of the region of interest in the training samples may be hierarchically modeled and learned in a spatially adaptive way. In one implementation, the vertices of the deformable model are hierarchically clustered into a set of nodes (or sub-surfaces) based on geometric and appearance similarities. The appearance characteristics of each node may then be captured by spatially adaptive boundary detectors learned using, for example, a machine learning method.

Another aspect of the present framework clusters shape instances of the training image data to build multiple statistical shape models to incorporate non-Gaussian shape priors. Since each cluster of shape instances represents one of the distribution modes in the shape space, multiple statistical shape models are able to provide more "specific" refinement to the deformable model.

Deformable models are curves or surfaces that move under the influence of internal forces and external forces. The deformation process is formulated as an optimization problem, with an objective function comprising an external energy term and internal energy term. The internal energy is designed to preserve the geometric characteristics or shape of the organ under study, and is defined within the curve or surface itself. The external energy is defined to move the deformable model toward organ boundaries, and is computed from image data. Typically, the external energy term is derived from edge information (e.g., image gradient), local regional information or texture models. However, such external energy terms are usually designed for a specific imaging modality and structure, and therefore lack scalability to different medical imaging modalities or structures.

The exemplary deformable model may be represented by a triangle mesh: $S \equiv (V,T)$, where $V=\{v_i | i=1, \ldots, N\}$ denotes the vertices of the sub-surface S and $T=\{t_j | j=1, \ldots, M\}$ denotes the triangles defined by the vertices. A vertex may comprise one or more voxels (or pixels) in the image data.

Mathematically, the segmentation problem may be formulated as the minimization of an energy function (1):

$$E(S) = E_{ext}(S) + E_{int}(S) \qquad (1)$$
$$= \sum_{i=1}^{N} E_{ext}(v_i) + E_{int}(S)$$

where $E_{ext}$ and $E_{int}$ are image (external) energy and shape (internal) energy terms.

A hierarchical deformation strategy may be employed to solve this high dimensional optimization problem. In order to avoid the chances of a local minima, the present framework may use an optimization strategy, such as the one described in Zhan Y., Shen D., *Deformable segmentation of 3-d ultrasound prostate images using statistical texture matching method*, IEEE Trans. Med. Imaging 25 (2006) 256-272, the entire contents of which are hereby incorporated by reference.

Learning-based methods capture boundary characteristics from training data. The "design" of external energy using such learning-based methods is data driven and extendable to different imaging modalities. However, a potential problem is that the boundary characteristics of organs can seldom be learned by a single classifier due to heterogeneous characteristics along organ boundaries.

Figure 6:
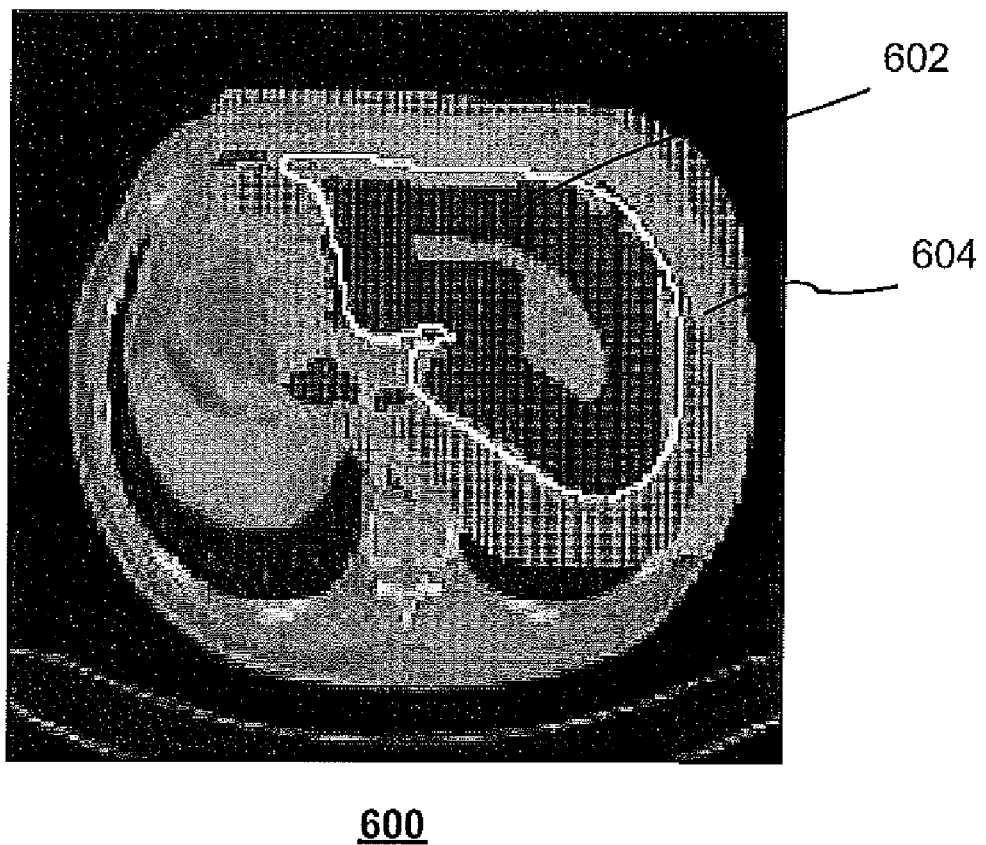
FIG. 6 shows an exemplary clinical image after a first node split.

FIG. 6 shows an exemplary clinical image 600 after a first node split in accordance with the present framework. The samples are evenly distributed between the regions (602 and 604) associated with the child nodes. As shown, the incorporation of clustering within the classification framework effectively achieves a more globally optimal solution.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of generating a hierarchical classifier on a computer system for classifying digitized data, comprising:
   determining a divergence measure of a node of the hierarchical classifier, wherein the node represents a set of digitized data;

determining a splitting criterion based on the divergence measure, wherein
    if the divergence measure is below a threshold value, the splitting criterion comprises a divergence-based splitting criterion which maximizes subsequent divergence after a split, and
    if the divergence measure is about or above the threshold value, the splitting criterion comprises an information-based splitting criterion which minimizes subsequent misclassification error after the split; and
dividing, based on the splitting criterion, the data at the node into at least two child nodes to form at least a portion of the hierarchical classifier.

2. The method of claim 1 wherein the dividing the data comprises dividing the data at the node into two child nodes to form at least a portion of a binary decision tree.

3. The method of claim 1 wherein the dividing the data comprises dividing the data at the node into more than two child nodes to form at least a portion of a non-binary decision tree.

4. The method of claim 1 further comprises recursively repeating the steps of determining the divergence and dividing the data until a stopping criterion is satisfied.

5. The method of claim 4 wherein the stopping criterion comprises reaching a desired maximum depth.

6. The method of claim 1 wherein the hierarchical classifier comprises one or more random forests.

7. The method of claim 1 wherein the set of digitized data comprises image data samples.

8. The method of claim 7 wherein the image data samples comprise boundary image samples and non-boundary image samples.

9. The method of claim 7 wherein the image data samples comprise medical image samples.

10. The method of claim 1 wherein determining the divergence measure comprises determining a Kullback-Leibler type divergence.

11. The method of claim 10 wherein determining the divergence measure comprises determining a weighted Kullback-Leibler divergence.

12. The method of claim 10 wherein determining the divergence measure comprises determining a Jensen-Shannon divergence.

13. The method of claim 1 wherein the divergence-based splitting criterion is based on a Kullback-Leibler type divergence.

14. The method of claim 13 wherein the divergence-based splitting criterion is based on a weighted Kullback-Leibler divergence.

15. The method of claim 13 wherein the divergence-based splitting criterion is based on a Jensen-Shannon divergence.

16. The method of claim 1 wherein the information-based splitting criterion is based on an entropy measure.

17. The method of claim 1 wherein the information-based splitting criterion is based on a Gini index.

18. The method of claim 1 wherein the information-based splitting criterion is based on a likelihood ratio.

19. A non-transitory computer readable medium embodying a program of instructions executable by a machine to perform steps for generating a hierarchical classifier for classifying digitized data, the steps comprising:
determining a divergence measure of a node of the hierarchical classifier, wherein the node represents a set of digitized data;
determining a splitting criterion based on the divergence measure, wherein
    if the divergence measure is below a threshold value, the splitting criterion comprises a divergence-based splitting criterion which maximizes subsequent divergence, and
    if the divergence measure is about or above the threshold value, the splitting criterion comprises an information-based splitting criterion which minimizes subsequent misclassification error; and
dividing, based on the splitting criterion, the data at the node into at least two child nodes to form at least a portion of the hierarchical classifier.

20. A system for generating a hierarchical classifier for classifying digitized data, comprising:
a memory device for storing computer readable program code; and
a processor in communication with the memory device, the processor being operative with the computer readable program code to:
determine a divergence measure of a node of the hierarchical classifier, wherein the node represents a set of digitized data;
determine a splitting criterion based on the divergence measure, wherein
    if the divergence measure is below a threshold value, the splitting criterion comprises a divergence-based splitting criterion which maximizes subsequent divergence, and
    if the divergence measure is about or above the threshold value, the splitting criterion comprises an information-based splitting criterion which minimizes subsequent misclassification error; and
divide, based on the splitting criterion, the data at the node into at least two child nodes to form at least a portion of the hierarchical classifier.

* * * * *